United States Patent [19]

Forslund

[11] Patent Number: 4,742,854
[45] Date of Patent: May 10, 1988

[54] FEEDING DEVICE FOR EFFECTING A LONGITUDINALLY DIRECTED RELATIVE MOVEMENT BETWEEN A STEM AND THE DEVICE PROPER

[75] Inventor: Torsten Forslund, Alfta, Sweden

[73] Assignee: OSA AB, Alfta, Sweden

[21] Appl. No.: 36,879

[22] Filed: Apr. 9, 1987

[30] Foreign Application Priority Data

Apr. 11, 1986 [SE] Sweden ............................. 8601628

[51] Int. Cl.⁴ ............................................. B27L 1/00
[52] U.S. Cl. ......................... 144/242 D; 144/2 Z; 144/343; 198/813; 198/853
[58] Field of Search ............... 198/813, 853; 144/2 Z, 144/3 D, 242 R, 242 D, 338, 343

[56] References Cited

U.S. PATENT DOCUMENTS

| | | | |
|---|---|---|---|
| 3,595,288 | 7/1971 | Landers | 144/338 |
| 3,763,905 | 10/1973 | Hamilton et al. | 144/2 Z |
| 3,972,358 | 8/1976 | Kappler | 144/2 Z |

*Primary Examiner*—W. Donald Bray
*Attorney, Agent, or Firm*—McFadden Fincham & Co

[57] ABSTRACT

A feeding device for effecting a longitudinally directed relative movement between a stem and the device proper comprises at least one feeding unit in the form of an endless band or band-like element which is drivable by means of at least one rotatable wheel. The endless element is composed of a large number of hingedly interconnected chain-forming links (11, 12) which are movable along the outer side or the periphery of an elongate guide bar and which, by bearing against said bar (10), are adapted to transfer substantially uniformly distributed bearing pressures to the stem substantially throughout the length of said bar.

16 Claims, 5 Drawing Sheets

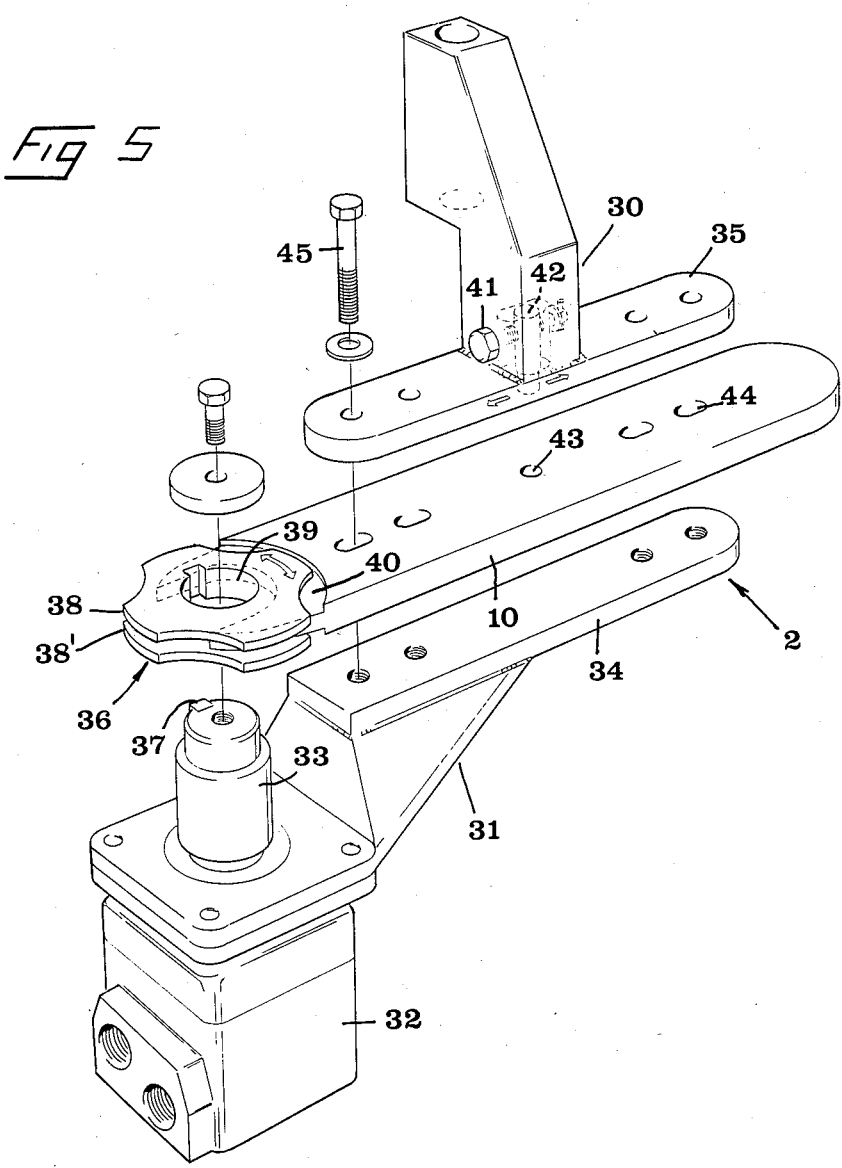
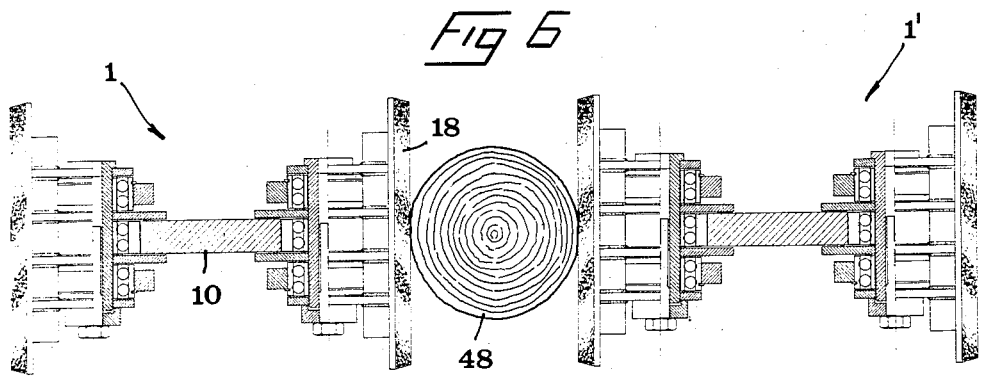

4,742,854

FEEDING DEVICE FOR EFFECTING A LONGITUDINALLY DIRECTED RELATIVE MOVEMENT BETWEEN A STEM AND THE DEVICE PROPER

TECHNICAL FIELD OF THE INVENTION

The present invention relates to a feeding device for effecting a longitudinally directed relative movement between a stem and the device proper, comprising at least one feeding unit in the form of an endless band or band-like element which is drivable by means of at least one rotatable wheel, said endless element being composed of a large number of hingedly interconnected chain-forming links which are movable along the outer side or the periphery of an elongate rigid frame element and which, by bearing against said frame element, are adapted to transfer substantially uniformly distributed bearing pressures to the stem substantially throughout the length of said frame element.

BACKGROUND OF THE INVENTION

A major problem in, inter alia, processors and harvesters of the type used in mechanised forestry is the difficulty of effecting reliable feeding of individual stems past the limbing tools which serve to delimb the stems. Thus, conventional stem feeding devices often slip against the stem if the resistance to delimbing is great. The slipping tendency is especially pronounced in periods of sap flow when the adherence of the bark to the stemwood is extremely low.

The spiked rollers previously used for these feeding operations have now been abandoned for the reason that they cause unacceptable damage to the stemwood, thereby deteriorating the wood quality. Instead of such spiked rollers, use has been made of large diameter rubber wheels in order to establish a large contact surface between the stem and the feeding units. However, these arrangements suffer from the serious disadvantage that two wheels of large diameters are extremely space-requiring, which makes the processor or harvester unwieldy and difficult to operate. To solve this problem, it has also been attempted to use, for the feeding units, endless bands which are passed around two spaced-apart wheels and urged with one side against the stem, but also these band feeders have been unsatisfactory because only a point load is achieved at the two wheels and, between these wheels, a diffuse and weak band engagement pressure which has but a marginal effect.

WO85/05589 (PCT/FI85/00046) discloses an arrangement in which it is attempted to solve the above-mentioned problems by using an endless chain member which is carried by driving and idling wheels. Between these wheels, the chain member is carried by slideways to ensure that the chain member engages the stem. The chain member is composed of standard roller chains which, however, entail a number of disadvantages. To ensure that the chain member will operate as intended, it has been formed with a large number of links in the longitudinal direction, and the driving and idling wheels have a comparatively large radius. Furthermore, the chain member has been trebled with laterally offset links, which means that the chain member has a very large number of hinges. The outer parts of the chain member slide on semicircular separate slideways in the area of the driving wheel, and these slideways have a peripheral radius of the same size as the effective radius of the driving wheel. A chain member of this type requires much maintenance because the hinges wear makes frequent retensioning necessary. Chain members of this type are subject to intense wear, and even a low wear causes considerable changes in the length of the chain because of the large number of parts subject to wear. This is the case also if the chain member, like other roller chains, is lubricated and cleaned as often as required. Furthermore, the load on the stem must be restricted because of the comparatively slender dimensions of the chain and the resultant slender dimensions of the feeder frame parts cooperating with the chain. Finally, it should be noted that the friction losses in a chain system of this type will be large even if the system has been adequately lubricated and cleaned, and the need for frequent lubrication and cleaning constitutes a further serious disadvantage.

BRIEF DESCRIPTION OF THE INVENTION

The present invention aims at obviating the above-mentioned disadvantages and to provide a feeding device which, on the one hand, is compact and readily built into a harvester or the like and, on the other hand, provides an extremely large contact surface against the stem and thus a feed which is reliable at all times. These and other objects are achieved in accordance with the main characteristic features of the invention in that the driving wheel is arranged at one end and in the extension of the frame element and has a plurality of projections, preferably four, which are adapted to engage between adjacent hinge pins or idling rollers for the links and which define recesses in the driving wheel; that oblique peripheral supporting surfaces are adapted to connect onto peripheral supporting surfaces, arranged on said frame element, for the endless element, said oblique supporting surfaces terminating on a level with or projecting slightly through a plane which extends through the center axis of the driving wheel and is perpendicular to said relative movement; and that the outer end of said oblique supporting surfaces is located on a level with the innermost part of the recesses from where the supporting surfaces extend in an outward direction away from the center axis of said driving wheel and merge into peripheral supporting surfaces, whereby the individual hinge pin or idling roller is removed from said driving wheel when said pin or roller starts leaving said driving wheel.

According to a preferred embodiment of the invention, the idling rollers are mounted on ball bearings or the like. According to another preferred embodiment, the driving wheels have arcuate recesses of a diameter larger than that of said hinge pins or the idling rollers connected thereto, in order to impart to the hinge at issue a torque which automatically tensions that part of the chain which extends from said hinge to the contact surface of the chain against the stem.

BRIEF DESCRIPTION OF THE DRAWINGS

In the drawings

FIG. 5 is an exploded view of a frame for the feeding unit according to FIG. 2;

FIG. 6 is a cross-sectional view of two feeding units comprised by the feeding device;

DETAILED DESCRIPTION OF A PREFERRED EMBODIMENT OF THE INVENTION

Figure 1:
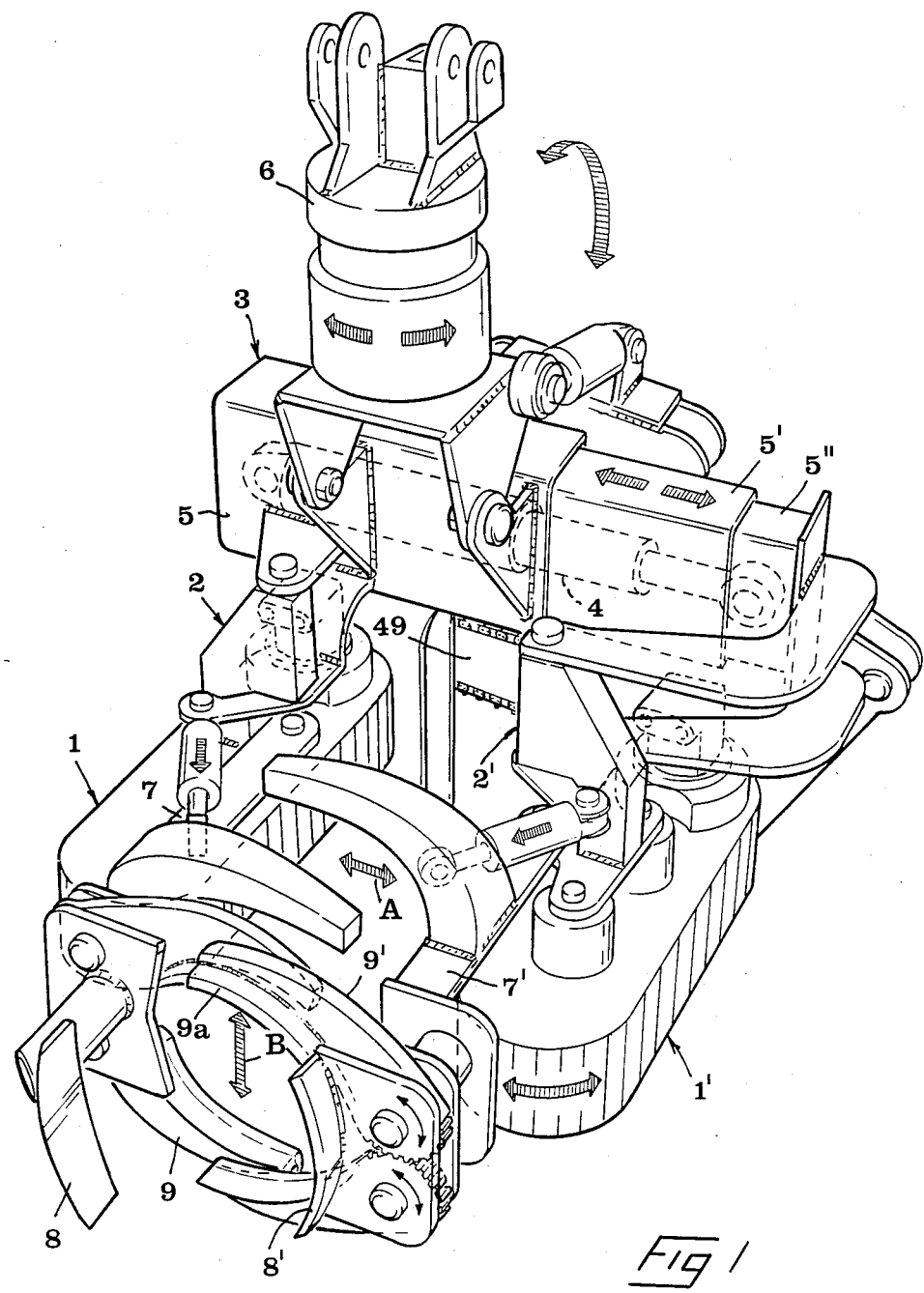
FIG. 1 is a perspective view of a one-grapple harvester equipped with a feeding device according to the invention.
Figure 2:
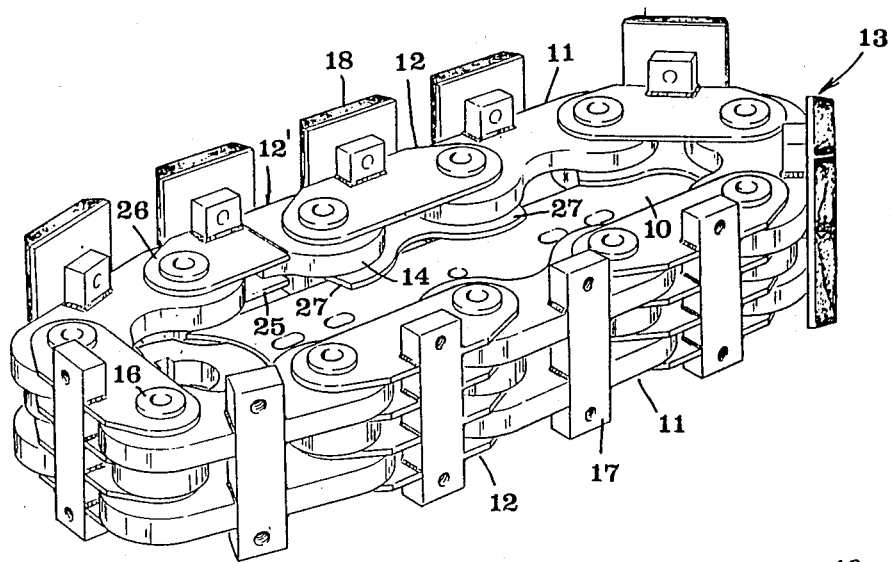
FIG. 2 is a perspective view of a feeding unit according to the invention.

FIG. 1 illustrates a one-grapple harvester including a feeding device which is designed in accordance with the invention and composed of two individual feeding units 1, 1'. Each feeding unit comprises a frame 2, 2' pivotally mounted on an applicator which is designated 3 in its entirety and which, in the embodiment illustrated, includes three square tubes 5, 5', 5" telescopically movable relative to one another by means of a hydraulic cylinder 4. The tube 5 is hingedly suspended in a rotator 6 which in turn may be mounted in known manner on the free end of a boom (not shown). The movability of the square tubes 5, 5', 5" makes it possible to move the two feeding units 1, 1' toward and away from one another in the direction of the double arrow A, while gripping or releasing a stem (see also FIG. 9).

Also mounted on the frames 2, 2', in addition to the feeding units 1, 1', are pivotal supporting arms 7, 7' each supporting a stationary limbing tool 8, 8' in the form of knives and movable limbing tools 9, 9' in the form of arcuate claws which can be swung toward and away from another in the direction of the double arrow B for gripping stems of varying diameters and which also have knives 9a.

Figure 3:
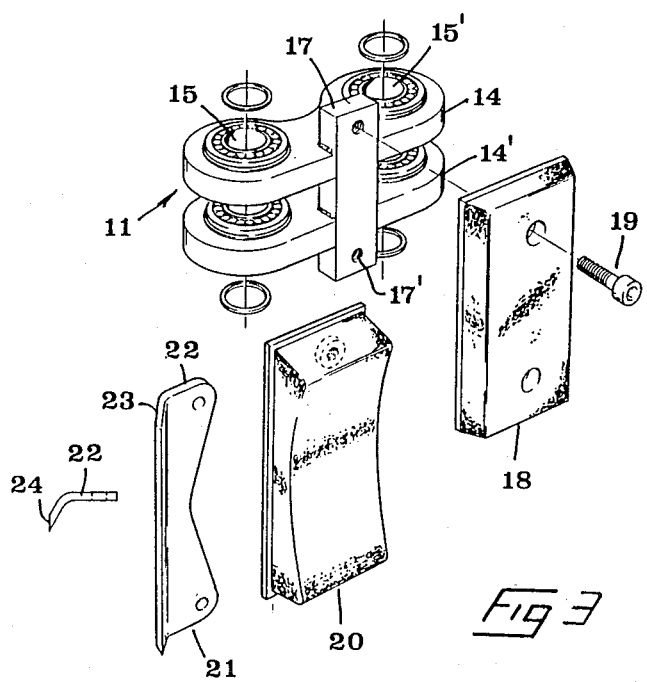
Figure 8:
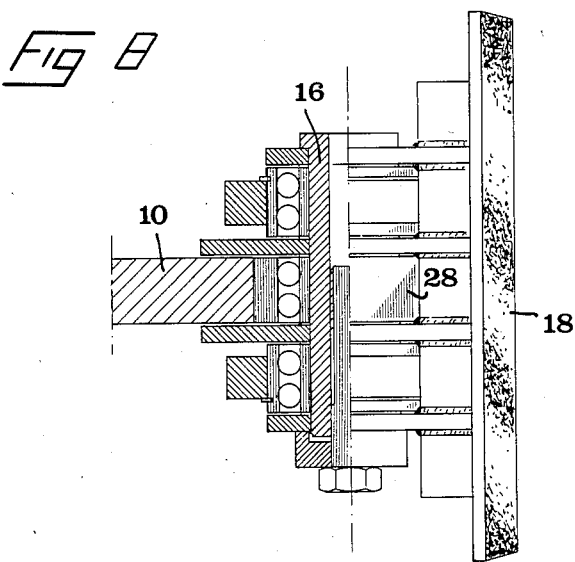
FIG. 8 is a partial cross-sectional view of a detail.

FIGS. 2–8 illustrate in detail a feeding unit 1 according to the invention. As will be evident from FIGS. 2–5, the unit comprises an elongate rigid frame element 10, along the periphery of which a plurality of hingedly interconnected links 11, 12 are movable, said links jointly forming a chain encompassing said frame element and generally designated 13. According to a preferred embodiment of the invention, the frame element 10 is a relatively thin bar-shaped element having a peripheral edge portion which projects between spaced-apart guide flanges of at least some links. A first type of links which is shown in FIG. 3 comprises two spaced-apart, essentially parallel and preferably thick plates 14, 14' each having two holes 15, 15' for the hinge pins 16 which serve to interconnect adjacent links 11, 12. The two plates 14, 14' are rigidly interconnected by means of a cross member 17 having two threaded holes 17' and serving as an attachment for a removable driver. FIG. 3 illustrates three different driver types, the first driver 18 being in the form of a rectangular plate of rubber or other friction material, which can be screwed to the attachment 17 by means of screws 19. It should here be noted that both the cross member 17 and the driver 18 have a length which is notably greater than the thickness of the bar 10, which implies that the chain formed by the above-mentioned links will be relatively wide.

Also the driver 20 is a plate, although it has a concave outer side instead of the flat outer side of the driver 18. The driver 21, finally, is angular in cross-section, such that it has a flange 22 to be clamped against the attachment 17 and a flange 23 bent upwardly from said flange 22 at an acute angle. The free end of the flange 23 is ground down at 24, more particularly at a substantially right angle to the flange 22, thereby forming a cutting edge adapted to bite into the bark of the stem.

Figure 4:
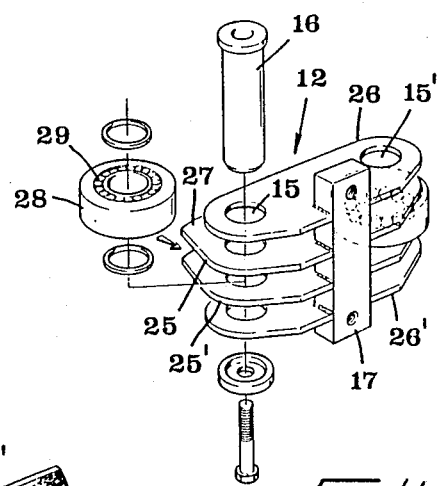
FIGS. 3 and 4 are exploded views of two different types of links comprised by the feeding unit according to FIG. 2, FIG. 3 showing three alternative embodiments of a driver.

The other type of link 12 which is shown in FIG. 4, comprises four spaced-apart, essentially parallel and preferably thin plates 25, 25' and 26, 26' which also have holes 15, 15' for the hinge pins 16. These plates are interconnected by means of a cross member 17 adapted to receive the driver at issue. The two inner plates 25, 25' are slightly extended inwardly in relation to the plates 26, 26' to form projections 27 which serve as guide flanges encompassing the peripheral edge of the guide bar 10.

In order to reduce the friction resistance between the guide bar 10 and the links 11, 12 as these are being driven along the periphery of the bar, the links are provided with idling rollers 28. As will appear from FIG. 4, these rollers are preferably mounted on the outer side of the pin 16 which interconnects two adjacent links, a bearing 29 being provided between the roller proper and the hinge pin 16. Upon assembly of the links 11, 12, the idling roller 28 is, of course, inserted between the inner plates 25, 25' of the link 12, while the two thicker plates 14, 14' of the link 11 are each moved into the space between an inner and an outer plate 25, 26 of the link 12.

As will be seen from FIG. 5, the frame 2 carrying the feeding unit 1 comprises a top part 30 and a bottom part 31, said bottom part being connected with a hydraulic motor 32 and a rotary shaft 33 driven by said motor 32. The bottom part 31 also comprises a bracket-like support plate 34 to which the guide bar 10 can be attached by means of a pressure plate 35 on the top part 30. At one end of the guide bar 10, a driving wheel 36 (see also FIG. 7) is provided which is in engagement with said rotary shaft 33 via a key 37. The driving wheel 36 has a total thickness not essentially greater than the thickness of the guide bar 10. To achieve this, the wheel is composed of two separate plates 38, 38' which are interconnected by a central hub-shaped portion 39 located in a recess which is defined by two fork-shaped projections on a thinner portion 40 of the guide bar 10. To enable coarse adjustment of the tension of the chain 13 passed around the guide bar, the guide bar can be slidably moved and fixed in relation to the plates 34, 35. To accomplish this adjustment, a screw 41 is provided which engages with a locking pin 42 projecting into a hole 43 in the guide bar 10, and furthermore the throughholes 44 for the fastening screws 45 are oblong. By adjusting the screw 41, the pin 42 can be made to move the guide bar relative to the plates 34, 35 and thus relative to the wheel 36 whose position is determined by the shaft 33 of the frame. After adjustment has been effected, the guide bar can be fixed in a desired position, with the desired chain tension, by means of the screws 45.

Figure 7:
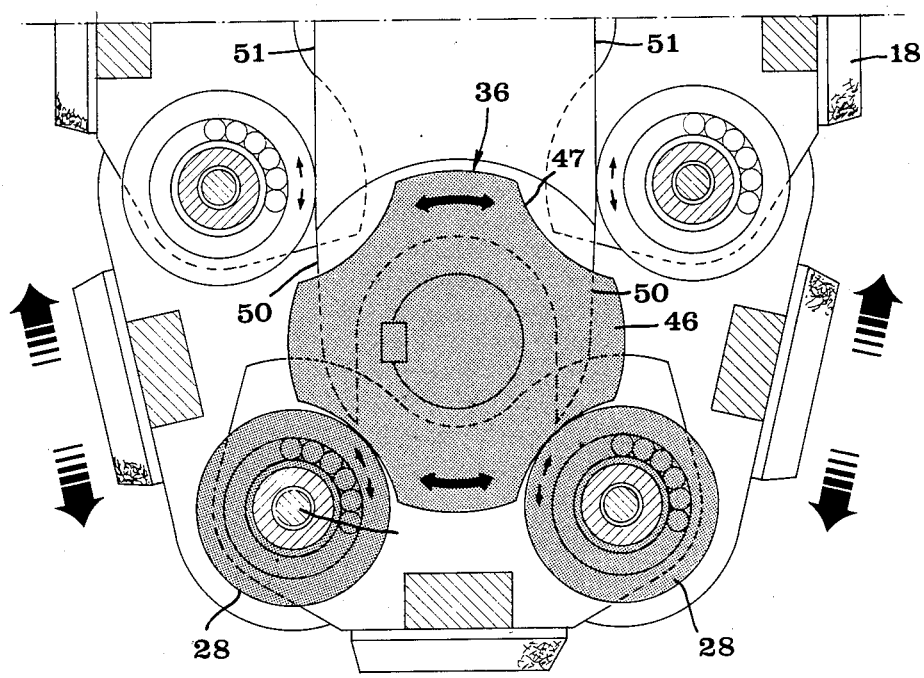
FIG. 7 is an enlarged partially cut plan view of a feeding unit.

As will be best seen from FIG. 7, the driving wheel 36 comprises a plurality of projections 46, in this instance four, between which arcuately rounded recesses 47 are provided. The projections 46 are adapted to engage between adjacent hinge pins of the chain, more particulary between the idling rollers 28 on the hinge pins, and the rounded recesses 47 are urged against the circular periphery of said idling rollers. To facilitate the engagement of the wheel with the rollers 28, and the release from said rollers, the recesses 47 have a larger diameter than the rollers, as will be clearly seen from FIG. 7. By designing the driving wheel in this manner, it is also ensured that the chain 13 will be self-tensioning in so far as the wheel applies to the idling rollers 28 a torque which continuously tensions that part of the chain which extends between the driver 18 contacting the stem and the idling roller adjacent said driver and engaged by the driving wheel. It should be noted in this connection that the guide bar 10 in the area adjacent the driving wheel 36 has peripheral supporting surfaces 50 which are slightly inclined in relation to the otherwise straight peripheral support surfaces 51 of the bar. In this manner, the individual drivers will be released from the stem before the associated link reaches the driving wheel and is turned thereby. In actual practice, the angle of inclination of the supporting surfaces 50 relative to the surfaces 51 may amount to 1–5°, preferably 2–4°. To ensure satisfactory operation of the chain, the number of hinge pins is odd, as will appear from FIG. 2. This is achieved by means of a special link 12', half of which consists of two thick plates 14, while the other half comprises four thin plates 25, 26. Because of the odd number of links, two adjacent links can form, at one end of the guide bar, acute angles to the longitudinal axis of the bar, simultaneously as one linke at the opposite end is positioned transversely or perpendicular to said longitudinal axis, and vice versa. This principle neutralises the geometrical chain tension variations which become unacceptably large with even hinge pin numbers.

The two feeding units 1, 1' illustrated in FIG. 1 are adapted to cooperate not only in so far as they are movable toward and away from one another by means of the applicator 3, but also in so far as the hydraulic motors 32 for driving the chains 13 are connected in series or in parallel via flow distributors, such that they will positively ensure exactly the same feed rate for both chains. This means that slipping of one feeding unit is prevented in case it should temporarily loose its grip on the stem. The function of the hydraulic motors connected in series or parallel is basically the same as that of the driving wheels of a tractor, the differential lock of which has been activated, whereby the risk of slipping has been reduced to an absolute minimum.

The minimal slipping risk also implies that the two feeding units can be utilised for measuring the length of the stem which is being fed through the device. An apparatus for length measurement (not shown) may thus be coupled to the chain movement on the stem, whereby a reliable and robust measuring pulse generator is obtained which gives exact measured value at all times.

Function and advantages of the invention

The basic idea of the present invention makes it possible to give the driving wheel 36 an extremely small diameter, with but a few projections or recesses 47 for the hinge pins of the band element, thereby avoiding the so-called polygonal effect, simultaneously as an effective tension of the band element is maintained. A small driving wheel diameter implies that the entire assembly can be made extremely compact and light, even if the band element is designed sufficiently powerful and thick to permit on the one hand heavy bearing pressures on the stem and, on the other hand, the use of ball bearings 29 or the like for the link rollers 28 of the band element. The use of ball bearings implies, inter alia, that no additional idling wheels are required to support the band element which, because of the ball bearings, is able to effortlessly follow the frame element also through the small curve radii resulting from the small width of the band element. The variations in tension that may occur in this respect are readily compensated for by means of the automatic tension control. It should here be mentioned that this possibility of controlling the tension also is a consequence of the small size of the driving wheel and its relatively large projections 46 since this is a condition for allowing sufficiently large movements of the band element to ensure tension control. Moreover, the driving wheel may be given a diameter which is considerably smaller than the width of the frame element, without overdimensioning the assembly, and this implies that the driving wheel and its bearings will not be subjected to the load of the bearing pressure against the stem.

As a consequence, the number of movable parts of the feeding device can be kept at a minimum, simultaneously as the inner friction will be extremely low. Coarse adjustment of the chain tension is seldom necessary since the outer and inner friction in the band element as well as the number of links therein, and thus the wear and the length variations resulting therefrom, can be kept at a minimum. As will appear from the drawings, the frame or guide bar element is preferably made symmetrical with a slideway around the entire periphery, accept for the part associated with the driving wheel. This means that the band element is supported and guided throughout its length and thus can move smoothly and without jerks. At the same time, the frame element, the wheels and the band element can be designed symmetrically, which means that, in principle, one and the same feeding unit can be used for all of the units comprised by the feeding device, and that the feeding unit can be simply turned round when one side of the frame element has been worn.

In its practical construction, the feeding device can be designed such that, in contrast to prior art feeding devices, it need not be continuously supplied with lubricant. Thus, the bearings of the idling rollers 28 may be closed, and there are no other details requiring lubrication. This is a great environmental advantage in that no lubricant can leak into the forest ground. Tests have shown that a feeding device designed in accordance with the present invention can operate for long periods of time without requiring lubrication or other maintenance, and without being subjected to harmful wear.

Figure 9:
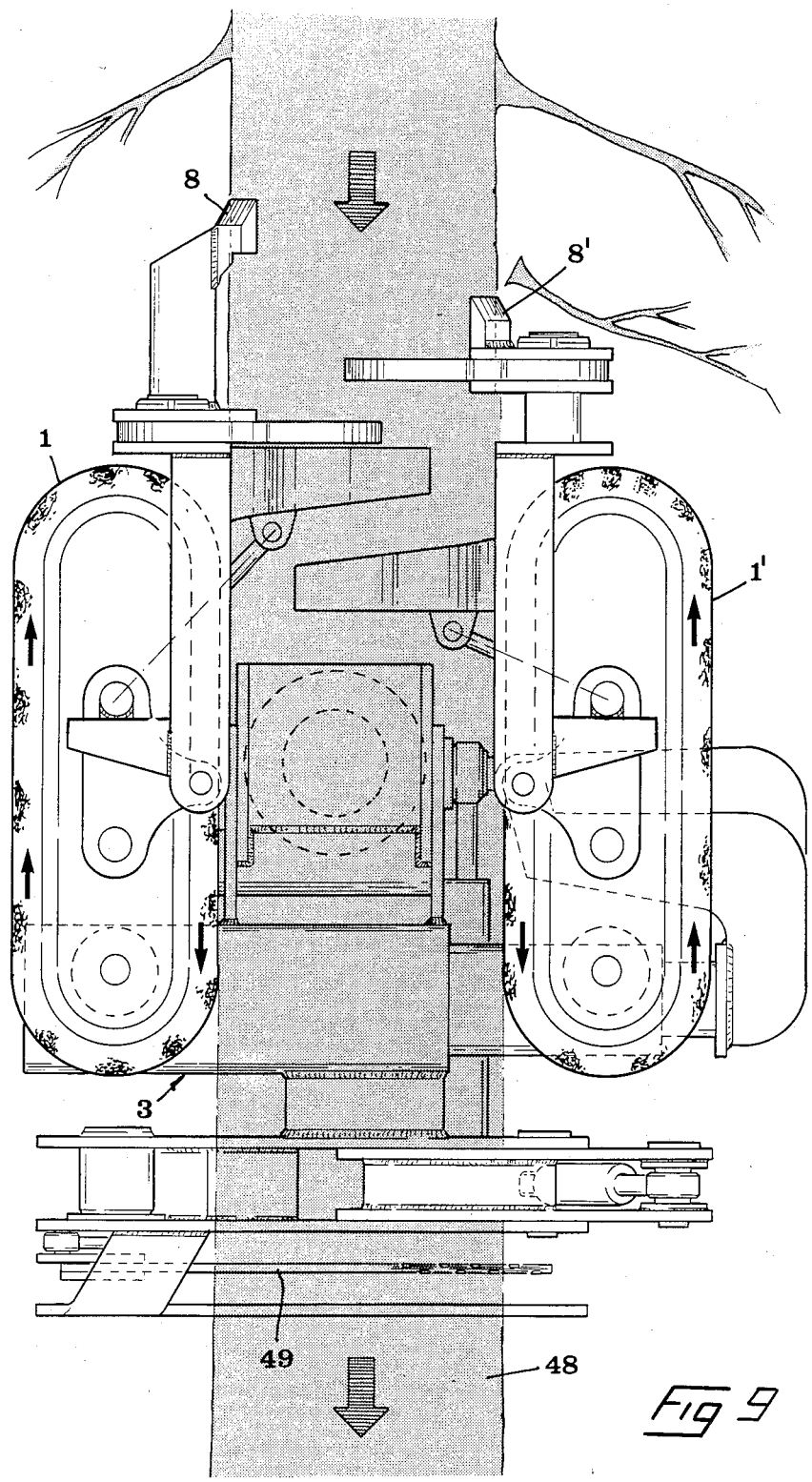
FIG. 9 is a view of the harvester according to FIG. 1 as seen from below.

After the tree 48 shown in FIG. 9 has been cut by means of the cutting tool 49 shown in FIGS. 1 and 9, it can be gripped between the feeding units 1, 1' To this end, the telescopic tubes 5, 5', 5" of the applicator 3 are drawn together by means of the cylinder 4, whereby the feeding units are urged against the diametrically opposite sides of the stem which is then fed longitudinally through the harvester by means of the hydraulic motors 32 which, by being operated in opposite directions of rotation, will cause the chains 13 of the two feeding units, via the shafts 33 and the driving wheels 36, to move along the guide bars 10, such that the two parts engaging the stem will travel from the limbing tools toward the cutting tool, thereby causing the limbing tools to delimb the stem. Because the individual links of the chains in the feeding units constantly engage the guide bar 10, the drivers 18 contacting the stem will transfer substantially uniformly distributed bearing pressures to the stem substantially throughout the length of the guide bar. This in turn means that a large total pressure load can be applied to the stem, in spite of the fact that the surface pressure of the individual drivers need not be excessive since the drivers jointly constitute a large effective bearing surface against the stem. In this manner, the feeding device in its entirety can apply to the stem a large pulling force, while utilising relatively low engine torques, in that the driving wheels have small torque radii and the inner friction of the feeding device is very low. A contributory factor in this respect is that the pulling force which is applied to the stem via the drivers, is transferred by static friction, i.e. the drivers follow the stem held between the feeding units along the major part of the length of the guide bar 10, without slipping on the stem and without damaging the bark of the stem by shearing forces. Since the coefficient of static friction is notably greater than the coefficient of sliding friction, the feeding device according to the invention thus gives a much improved transfer of forces as compared with, for example, the rubber wheels mentioned in the introduction. Another advantage of the feeding device according to the invention is that it requires very little space in the harvester, and furthermore the forces of gravity to be surmounted upon start and stop are relatively small as compared with prior art rubber wheels, and this implies that the feeding device can be started and stopped far more quickly and in exact positions. An essential advantage obtainable with small torque radii is that small and fairly inexpensive motors can be used.

Finally, it should be mentioned that the possibility of dismantling the chain drivers brings considerable advantages in actual operation. Thus, one or more damaged or worn drivers can be simply exchanged directly on the felling site, without interfering with the feeding device proper. Moreover, different types of drivers may be used, depending on such circumstances as the type of tree, the time of the year etc.

Possible modifications of the invention

It will be appreciated that the invention is not restricted to the embodiment described above and illustrated in the drawings. Thus, the feeding device can be used for many other applications than precisely a one-grapple harvester, for example in a twin-grapple harvester or in stationary machines, such as barking machines, saws etc. The term "stem" should be interpreted in its widest sense to include also logs or other wood products suitable for lengthwise feeding in the manner described above. Moreover, the feeding device according to the invention need not include two identical feeding units of the type according to the invention. Thus, one feeding unit may be designed according to the invention, whereas the other device which is applied against the stem or log, may be of a different optional type, for example, of the free-wheeling type having no drive of its own. Although the principle of the invention has been exemplified in the above description in connection with a feeding device which is stationary in so far as the stem is fed through or past it, the principle is applicable also in order to achieve a movement of the feeding device proper relative to a stationary stem. Thus, the feeding device may be used in a so-called stem delimber which is applied to the lower part of a grown tree and climbs and delimbs the tree to the desired height.

Other modifications are also possible. For example, the periphery of the guide bar can be bevelled to V-shape in cross-section and arranged to cooperate with likewise V-shaped guides on the links instead of the projections 27. It is also conceivable to apply to the chain an elastic endless belt, for example of rubber (such as neoprene rubber), optionally replacing the drivers 18, 20, 21.

I claim:

1. A feeding device for effecting relative longitudinal movement between a stem and said device, said device comprising at least one feeding unit comprising:
   an endless feeding element;
   at least one rotatable drive wheel for driving said endless feeding element, said drive wheel having a central axis perpendicular to the direction of said longitudinal movement;
   an elongated rigid frame having a peripheral edge and being operatively associated with said drive wheel and said endless feeding element, said frame element having an extension at one end thereof;
   said endless feeding element comprising a plurality of hingedly interconnected chain-forming links each with associated pin means or idling roller means, said links being movable along the peripheral edge of said rigid frame element and adapted to bear against said frame element, said chain-forming links being adapted to transfer substantially uniformly distributed bearing pressures to a stem along the length of said frame element when bearing against said frame element;
   said frame element extension having an oblique peripheral surface extending into said peripheral edge, said oblique peripheral surface extending at least to said central axis of said drive wheel;
   said drive wheel being operatively associated with said extension at said one end of said frame element, and comprising a plurality of projecting engaging means having a recess between adjacent engaging means with said projecting engaging means adapted to engage between adjacent pin means or idling roller means;
   said oblique peripheral surface having (a) an outer end positioned on a plane corresponding to an inner portion of said recesses and (b) a portion extending outwardly from said center axis of said rotatable drive wheel which merges into said peripheral edge whereby said pin means or idling roller means disengages from said driving wheel upon leaving engagement with said driving wheel.

2. A feeding device as claimed in claim 1, wherein said driving wheel comprises a pair of identical, spaced-apart members, said members being bridged by a hub-shaped portion, said oblique peripheral surface being positioned between said driving wheel members.

3. A feeding device as claimed in claim 1, wherein each link is operatively associated with a pair of idling rollers engaging said frame element and rotatably mounted in relation to said link, said idling rollers being adapted to minimise the friction resistance between the link and the frame element, each idling roller being mounted with bearing elements on the outer side of a pin, said pin functioning as a hinge pin between two adjacent links.

4. A feeding device as claimed in claim 1, wherein said frame element is a relatively thin, elongate bar-shaped element having a peripheral edge portion projecting between spaced-apart guide flanges of at least some of said links.

5. A feeding deivce as claimed in claim 4, wherein a first link comprises a pair of spaced-apart, essentially parallel plates having a pair of apertures for said pin means, said plates being rigidly interconnected with a cross member, and wherein a second adjacent link to said first link comprises four spaced-apart essentially parallel plates having a pair of apertures for said pin means, said plates of said second link being rigidly interconnected with a cross member, two of said four plates comprising inner plates and the other two plates of said four plates comprising outer plates, said inner plates being provided with said guide flanges for engaging the peripheral edge of said frame element, said plates of said first link having end portions projecting between said inner and outer plates of said second link, while aligning said apertures in order to interconnect said first and second adjacent links by a common hinge pin.

6. A feeding device as claimed in claim 5, wherein said links form a chain having an odd number of hinge pins.

7. A feeding device as claimed in claim 5 wherein the cross member of each link forms an attachment for a detachable driver.

8. A feeding device as claimed in claim 1, wherein said driving wheel is mounted on a shaft, said shaft being rotatably mounted in a frame, said frame also mounting said frame element, said driving wheel having arcuate recesses having a diameter greater than that of said pin means or the associated idling roller means, whereby a torque is imparted to said pin means for automatic tensioning of the chain part extending from said pin means to the chain contact surface against a stem.

9. A feeding device as claimed in claim 1, comprising a pair of essentially identical feeding units movable to and from each other to grip and release a stem, said device further including hydraulic motor means driving said endless feeding elements connected in series or in parallel with flow distributors whereby said endless feeding elements are driven at the same feed rate.

10. A feeding device as claimed in claim 1, comprising a first feeding unit as defined in claim 1 and a second feeding unit of a different type.

11. A feeding device as claimed in claim 1, wherien said feeding unit comprises means for determining the movement of the chain along a stem to measure the length of a stem section fed through the device.

12. A feeding device as claimed in claim 1 wherein said drive wheel includes four of said projecting engaging means and wherein said oblique peripheral surface projects beyond said central axis of said drive wheel.

13. A feeding device as claimed in claim 3, wherein said bearing elements comprise balls or rollers.

14. A feeding device as claimed in claim 5, wherein said plates of said first link are relatively thick and said plates of said second link are relatively thin.

15. A feeding device as claimed in claim 7, wherein said detachable driver comprises a rubber plate or a knife.

16. A feeding device as claimed in claim 10, wherein said different type of feeding unit is a free-wheeling type.

* * * * *